United States Patent [19]
Cook et al.

[11] Patent Number: 5,307,216
[45] Date of Patent: Apr. 26, 1994

[54] SECTOR IDENTIFICATION METHOD AND APPARATUS FOR A DIRECT ACCESS STORAGE DEVICE

[75] Inventors: Wesley A. Cook, Stewartville; Daniel D. Reno, Rochester, both of Minn.

[73] Assignee: International Business Machines Corporation, Armonk, N.Y.

[21] Appl. No.: 754,878

[22] Filed: Sep. 4, 1991

[51] Int. Cl.⁵ .............................................. G11B 21/08
[52] U.S. Cl. .................................. 360/72.1; 360/77.08
[58] Field of Search ................... 360/72.1, 77.08, 48, 360/51; 369/47, 48, 59, 124

[56] References Cited

U.S. PATENT DOCUMENTS

| | | |
|---|---|---|
| 4,133,011 | 1/1979 | Kurzweil, Jr. |
| 4,297,734 | 10/1981 | Laishley et al. |
| 4,297,737 | 10/1981 | Andresen et al. |
| 4,488,189 | 12/1984 | Axmear et al. |
| 4,575,776 | 3/1986 | Stephens et al. |
| 4,639,863 | 1/1987 | Harrison et al. |
| 4,860,194 | 8/1989 | Harrison et al. |
| 4,872,074 | 10/1989 | Brown et al. |
| 4,879,612 | 11/1989 | Freeze et al. |
| 4,884,152 | 11/1989 | Ide |
| 4,920,462 | 4/1990 | Couse et al. |
| 4,949,202 | 8/1990 | Kim |
| 4,956,727 | 9/1990 | Bezinque et al. |
| 4,977,472 | 12/1990 | Volz et al. |
| 4,984,100 | 1/1991 | Takayama et al. |

FOREIGN PATENT DOCUMENTS

| | | |
|---|---|---|
| 63-034742 | 2/1988 | Japan |
| 1-119914 | 5/1989 | Japan |
| 2193363 | 7/1991 | Japan |

OTHER PUBLICATIONS

IBM Technical Disclosure Bulletin, vol. 19, No. 11, Apr. 1977, pp. 4349-4351, "Sector Pulse Check Circuit", Dawson et al.
IBM Technical Disclosure Bulletin, vol. 30, No. 11, Apr. 1988, pp. 252-253, "Soft Sector Disk File System", Elliott et al.
IBM Technical Disclosure Bulletin, vol. 32, No. 5B, Oct. 1989, pp. 322-324. "Phase Error Detect Logic for Disk File Speed Control", Elliott et al.
IBM Technical Disclosure Bulletin, vol. 32, No. 6A, Nov. 1989, pp. 275-276, "Digital Encoding Scheme with Error Detection", Conway et al.

*Primary Examiner*—Paul M. Dzierzynski
*Assistant Examiner*—Richard Hanig
*Attorney, Agent, or Firm*—Joan Pennington; Richard E. Billion; Bradley A. Forrest

[57] ABSTRACT

A method and apparatus are provided for digitally correcting sector pulse placement in a direct access storage device. A sector clock signal is generated equal to a sub-multiple clock rate of a predetermined servo identification clock. An individual servo identification field location is identified and compared with an expected location of said individual servo identification field to identify an error value. The sector clock signal is modified by adding or subtracting clock pulses responsive to the identified error value for generating a sector pulse.

11 Claims, 1 Drawing Sheet

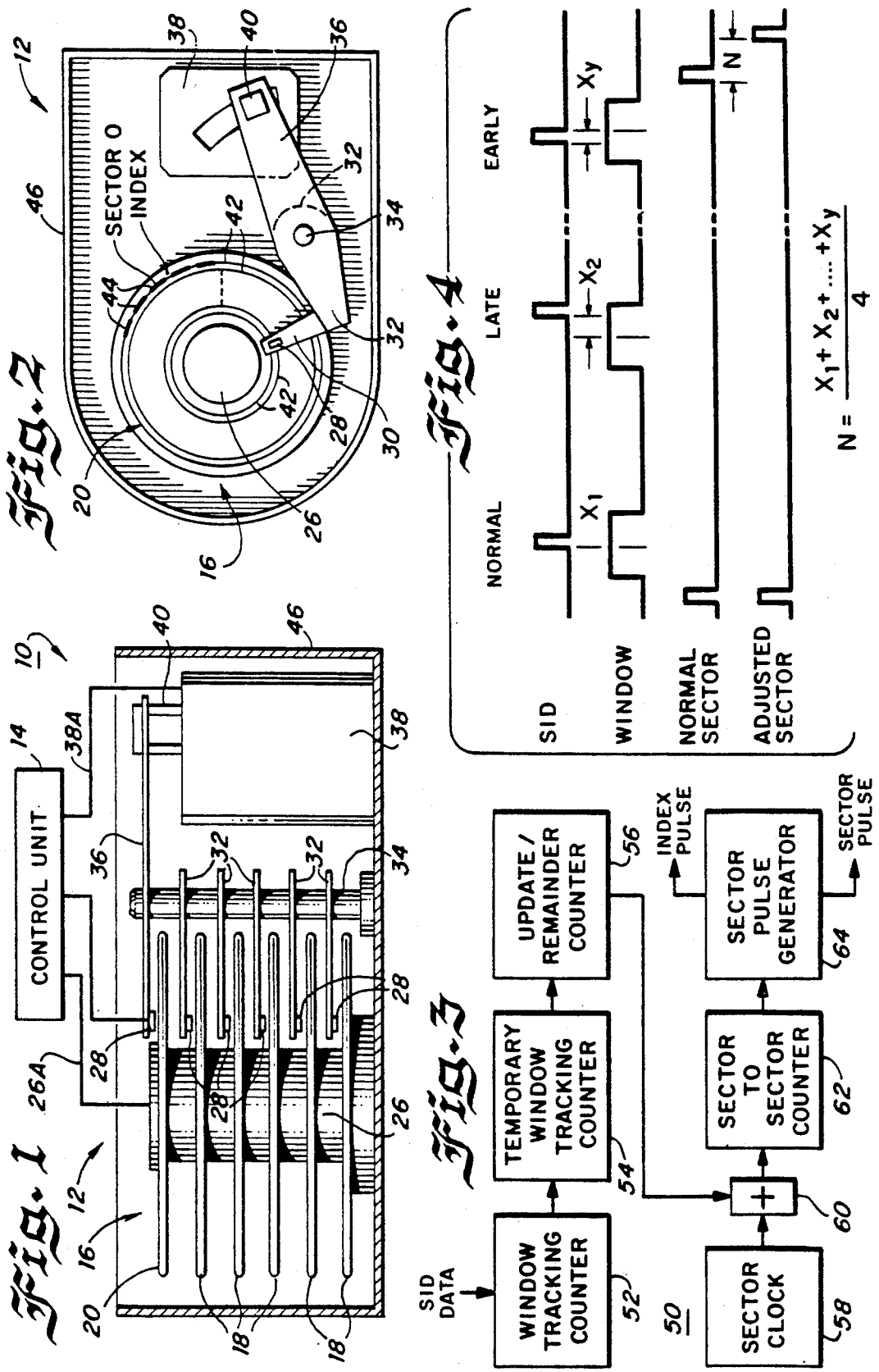

SECTOR IDENTIFICATION METHOD AND APPARATUS FOR A DIRECT ACCESS STORAGE DEVICE

BACKGROUND OF THE INVENTION

1. Field of the Invention

The invention relates generally to a method and apparatus for determining data sector locations, and more particularly to a method and apparatus for digitally correcting sector pulse placement in a direct access storage device (DASD).

2. Description of the Prior Art

Computers often include auxiliary memory storage units having media on which data can be written and from which data can be read for later use. Disk drive units incorporating stacked, commonly rotated rigid magnetic disks are used for storage of data in magnetic form on the disk surfaces. Data is recorded in concentric, radially spaced data information tracks arrayed on the surfaces of the disks. Transducer heads driven in a path toward and away from the drive axis write data to the disks and read data from the disks.

All DASD units must have a method to position each data head over the proper radial location to write a track and again, to position it very close to the same location to read the track. With the higher level files using a voice coil type of actuator, a feedback mechanism must be provided to locate and stably hold the head on a given track. Typically, track accessing and track following is provided utilizing a magnetically written pattern in the DASD unit. A dedicated servo system employs one surface of one of the disks in the DASD on which to have all the tracking and access information. A sector servo system uses small portions of tracks between each or between several sectors on each track of each data surface to provide the tracking and access information. A hybrid servo system uses both to obtain advantages of each type of servo.

Inherent to a fixed block DASD is the division of the disk into equally sized segments or sectors around the disk surface. Individual sectors contain a predefined size of individual groups of customer data saved for later retrieval and updates.

It is desirable to provide a DASD with variable sized sectors that can be defined to be unique according to the individual data format desired by the customer. Many known DASD units using sector servo are limited to the use of predefined areas of the disk for storing customer data. To provide variable sector sizes, known arrangements typically require analog circuitry for supplying a sector clock locked to the rotational speed of the disk. Locking the sector identification pulses to the rotational speed of the disk is necessary to ensure that the location of each sector is known, without requiring large sector overhead or wasted disk space for sector identification bytes to accommodate for variability of the motor speed over time. Known DASD units using dedicated servo do not easily facilitate the use of a large flexible array of sector sizes.

SUMMARY OF THE INVENTION

Important objects of the present invention are to provide a method and apparatus for digitally correcting sector pulse placement in a direct access storage device that facilitates flexibility in sector sizes; to provide such method and apparatus that does not require a predefined number of sector pulses around a revolution of a disk; and to provide such method and apparatus for digitally correcting sector pulse placement in a disk drive data storage system substantially without negative effects and that overcome many of the disadvantages of prior art arrangements.

In brief, the objects and advantages of the present invention are achieved by a method and apparatus for digitally correcting sector pulse placement in a direct access storage device. A sector clock signal is generated equal to a sub-multiple clock rate of a predetermined servo identification clock (SID clock). The SID clock is a fixed rate clock used to locate servo identification fields. An individual servo identification field location is identified and compared with an expected location of said individual servo identification field to identify an error value. The sector clock signal is modified by adding or subtracting clock pulses responsive to the identified error value for generating a sector pulse.

In accordance with the invention, adjustments to the generated sector pulse location are digitally corrected to accommodate rotational speed variations of data storage disks and allow a variable number of servo identification field locations around a revolution of the disk.

BRIEF DESCRIPTION OF THE DRAWINGS

The present invention together with the above and other objects and advantages may best be understood from the following detailed description of the embodiment of the invention illustrated in the drawings, wherein:

FIG. 1 is a schematic and block diagram of a data storage disk file embodying the present invention;

FIG. 2 is a diagram showing the accessing mechanism for a single disk surface of the apparatus of FIG. 1;

FIG. 3 is a diagram illustrating apparatus for carrying out the sector pulse correction method according to the present invention in the data storage disk file of FIG. 1; and FIG. 4 is a chart illustrating sector pulse correction operation of the apparatus of FIG. 3.

DETAILED DESCRIPTION OF THE PREFERRED EMBODIMENT

In FIG. 1 there is shown a partly schematic block diagram of parts of a data storage disk file 10 including a data storage medium generally designated as 12 and a control unit generally designated as 14. In the preferred embodiment of this invention, the data storage medium 12 is embodied in a rigid magnetic disk drive unit 12, although other mechanically moving memory configurations may be used. Unit 12 is illustrated in simplified form sufficient for an understanding of the present invention because the utility of the present invention is not limited to the details of a particular drive unit construction.

Referring now to FIGS. 1 and 2 of the drawings, disk drive unit 12 includes a stack 16 of disks 18 each having at least one magnetic surface 20. The disks 18 are mounted in parallel for simultaneous rotation on and by an integrated spindle and motor assembly 26. Data information on each disk 18 are read and/or written to by a corresponding transducer head 28 movable across the disk surface 20. In a disk drive using a dedicated or hybrid servo, one of the disk surfaces 20' stores servo information used to locate information and data on the other disk surfaces 20.

Transducer heads 28 are mounted on flexure springs 30 carried by arms 32 ganged together for simultaneous pivotal movement about a support spindle 34. One of the arms 32 includes an extension 36 driven in a pivotal motion by a head drive motor 38. Although several drive arrangements are commonly used, the motor 38 can include a voice coil motor 40 cooperating with a magnet and core assembly (not seen) operatively controlled for moving the transducer heads 28 in synchronism in a radial direction in order to position the heads in registration with data information tracks or data cylinders 42 to be followed and access particular data sectors 44. Although a rotary actuator is shown, it should be noted that this invention will work on disk drive having a linear actuator. Data storage disk file 10 is a modular unit including an enclosure or housing 46. The various components of the disk file 10 are controlled in operation by signals generated by control unit 34 such as motor control signals on line 26A and position control signals on line 38A.

Numerous data information tracks 42 each at a specific radial location are arrayed in a concentric pattern in the magnetic medium of each disk surface 20 of data disks 18. A data cylinder includes a set of corresponding data information tracks 42 for the portion of the disk surfaces 20 in the data storage disk file 10. Data information tracks 42 include a plurality of segments or data sectors 44 each for containing a predefined size of individual groups of data records which are saved for later retrieval and updates. The data information tracks 42 are disposed at predetermined positions relative to a servo reference index. In FIG. 2, one sector 44 is illustrated as SECTOR O with a fixed index or mark INDEX for properly locating the first data sector. The location of each next sector 44 is identified by a sector identification pulse.

Referring now to FIGS. 3 and 4, there is shown a block diagram illustrating apparatus 50 for digitally correcting sector pulse placement in the data storage disk file 10 and a chart illustrating the operation of apparatus 50. In accordance with the invention, digital correction of a clock generating sector pulses is provided based upon the expected location of individual servo identification (SID) fields on the servo disk surface 20.

First each SID read by transducer heads 28 is applied to a window tracking counter 52 that determines the actual error of the location of the SID as compared to the correct location in the center of the SID window. Window tracking counter 52 compares an expected location or position for the SID that is known based upon the SID fields on the disk surface 20 and the clock frequency used by the apparatus 50. The identified actual error equals the amount of variation of the SID location as compared to being located in the center of the SID window. Window tracking counter 52 is connected to a temporary window tracking counter 54 SID that is used as an up/down counter to interpret the amount of each SID location error in the window. An update/remainder counter 56 is connected to and updated by the temporary window tracking counter 54 to track the total variation in the locations of SID. Update/remainder counter 56 tracks the number of SID clocks of error seen in locating each SID that have not been accounted for by a sector clock 58. A sub-multiple clock of the SID clock defines the sector clock 58. By means of an example, a ¼ rate of the SID clock is the sub-multiple clock explained here in detail. It should be noted that any sub-multiple can be used to define the sub-multiple clock, such as ⅛, ⅓, or ½. In the ¼ rate sub-multiple clock described here, the number of SID clocks of error tracked by the update/remainder counter 56 include any variation less than 4 counts. The sector clock output is combined with the output of the update/remainder counter 56 by a combining block 60 and applied to a sector to sector counter 62. The ¼ rate of the SID clock output of the sector clock 58 is modified by either adding or dropping sector clock pulses corresponding to the error count of update/remainder counter 56. The output of sector to sector counter 62 is applied to a sector pulse generator 64 for generating an adjusted sector pulse as illustrated in FIG. 4. A normal SID X1, a late SID X2 and an early SID Xy are shown in FIG. 4 relative to the SID window. The sum of the differences are multiplied by the ¼ rate clock relation of the SID clock to the sector clock as follows:

$$N = \frac{X_1 + X_2 + \ldots + X_y}{4}$$

where y designates the total number of SID adjustments which exist between consecutive sector pulses and the value N equals the number of clock adjustments made to the placement of the digitally generated sector pulse of sector pulse generator 64. The maximum overhead required is the variation in the actual placement of the sector pulse that can result with the largest remainder in the update/remainder counter 56 added to the maximum amount of variation of the SID with the SID window.

Advantages provided by the digitally correcting sector pulse placement apparatus 50 are that variable sector sizes can be provided in the data storage disk file 10 without the added cost, space consumption and design changes required for an analog clock implementation locked to the disk speed. Further, the sector size format can be modified in increments of the sector clock and is not locked to SID field placement on the disk surface 20. Also, multiple sized sectors 44 are permitted within the disk file 10. To implement multiple sized sectors, the integral number of counts to the sector to sector counter 62 is changed to lengthen or shorten the sector size. Advantageously, the sector size can be easily changed to accommodate various sector sizes desired by a user.

While the invention has been described with reference to details of the illustrated embodiment, these details are not intended to limit the scope of the invention as defined in the appended claims.

What is claimed and desired to be secured by Letters Patent of the United States is:

1. Apparatus for digitally correcting sector pulse placement in a direct access storage device comprising:
    clock means for generating a sector clock signal;
    means for identifying an individual servo identification field location;
    means for comparing said identified individual servo identification field location with an expected location of said individual servo identification field to identify an error value; and
    means responsive to said sector clock signal and said identified error value for generating a sector pulse; wherein said means responsive to said sector clock signal and said identified error value for generating a sector pulse includes a combining circuit for modifying said sector clock signal by dropping or adding sector clock pulses corresponding to said error value and a sector to sector counter.

2. Apparatus as recited in claim 1 wherein said clock means for generating a sector clock signal is a sub-multiple clock of a predetermined servo identification clock.

3. Apparatus as recited in claim 2 wherein said sub-multiple clock equals ¼ rate of said predetermined servo identification clock.

4. Apparatus as recited in claim 1 wherein said means for identifying an individual servo identification field location includes a first window tracking counter for receiving detected servo identification data.

5. Apparatus as recited in claim 4 wherein said means for comparing said identified individual servo identification field with an expected location of said individual servo identification field to identify an error value includes said first window tracking counter for comparing said identified individual servo identification field location with a servo identification window center.

6. Apparatus as recited in claim 1 wherein said comparing means further includes a temporary window tracking counter coupled to said first window tracking counter comprising an up/down counter for determining a total variation of said compared individual servo identification field locations.

7. Apparatus as recited in claim 1 wherein said comparing means further includes an update/remainder counter for generating a counter value corresponding to said error value for adjusting said sector clock signal.

8. Apparatus according to claim 1 further including a sector to sector counter which stores an integer which counts clock pulses to locate the next sector, wherein the sector length can be changed to a desired value by changing the integer stored in the sector to sector counter.

9. A method for digitally correcting sector pulse placement in a direct access storage device comprising the steps of:

generating a sector clock signal equal to a sub-multiple clock rate of a predetermined servo identification clock;

identifying an individual servo identification field location;

comparing said identified individual servo identification field location with an expected location of said individual servo identification field and identifying an error value; and modifying said sector clock signal by dropping or adding sector clock pulses corresponding to said identified error value of said sub-multiple clock rate for generating a sector pulse.

10. A method as recited in claim 9 wherein said step of comparing said identified individual servo identification field location with an expected location of said individual servo identification field includes the step of comparing said individual servo identification field location with a servo identification window center to identify an offset clock count value corresponding to said error value.

11. A direct access storage device comprising:

a plurality of disk surfaces for storing data and for storing servo reference identification field locations, said disk surfaces mounted in parallel for simultaneous rotation about an axis;

transducer means mounted for movement in a radial direction across said disk surfaces for reading and writing data to said disk surfaces and for identifying individual servo identification field locations;

clock means for generating a sector clock signal;

means for comparing each said identified individual servo identification field location with an expected location of said individual servo identification field to identify an error value; and means responsive to said sector clock signal and said identified error value for generating a sector pulse; wherein said means responsive to said sector clock signal and said identified error value for generating a sector pulse includes a combining circuit for modifying said sector clock signal by dropping or adding sector clock pulses corresponding to said error value and a sector to sector counter.

* * * * *